(No Model.) 2 Sheets—Sheet 1.
M. L. NICHOLS.
BICYCLE BRAKE.
No. 586,142. Patented July 13, 1897.
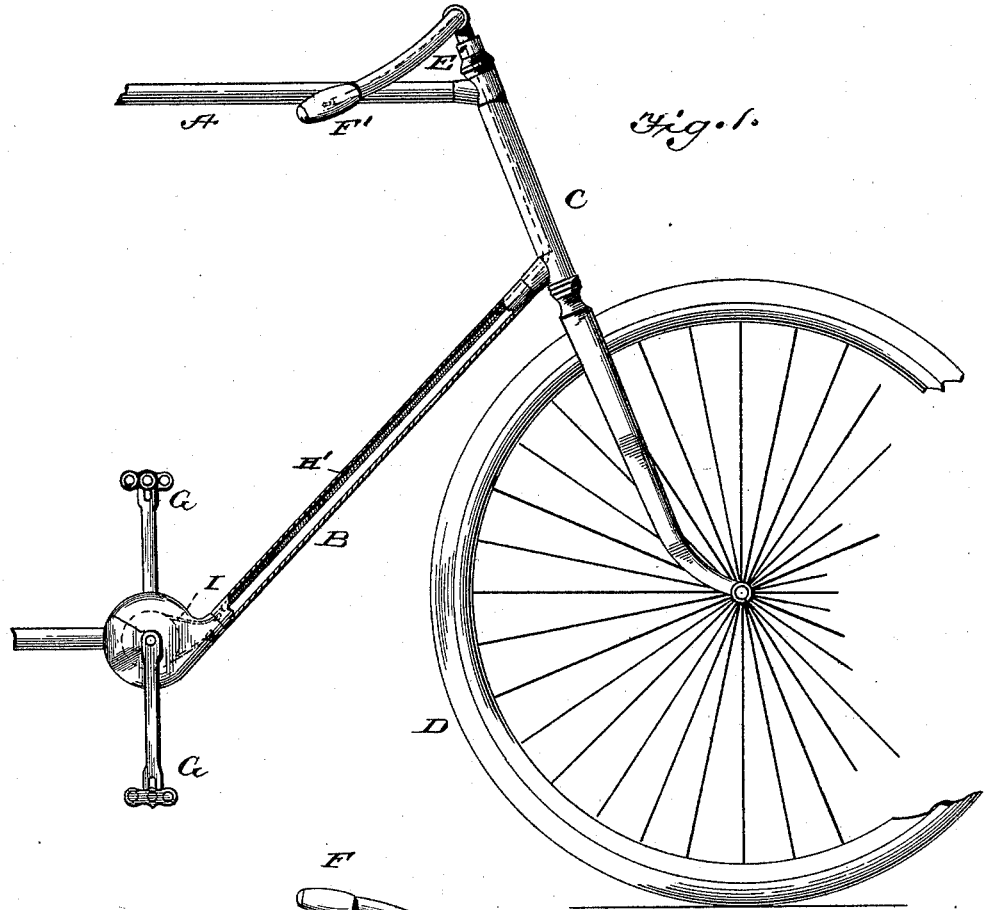
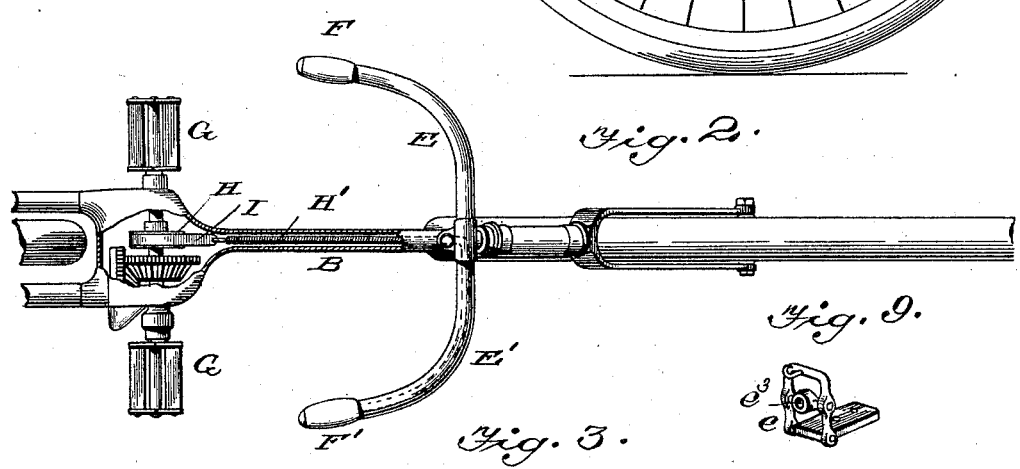
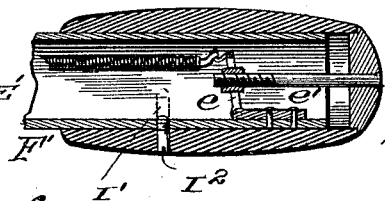
Witnesses
Inventor
M. L. Nichols
by Alex Mahon
Attorney (No Model.) 2 Sheets—Sheet 2.
M. L. NICHOLS.
BICYCLE BRAKE.
No. 586,142. Patented July 13, 1897.
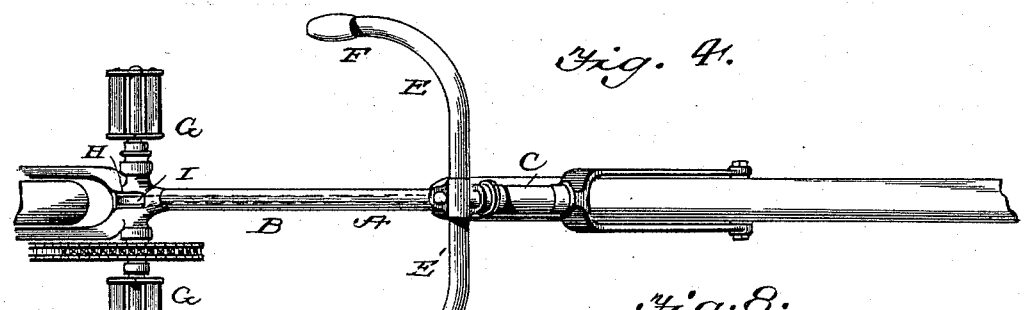
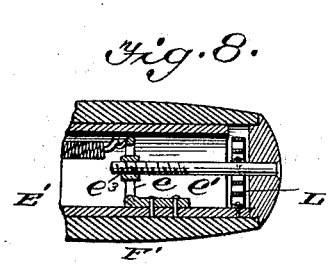
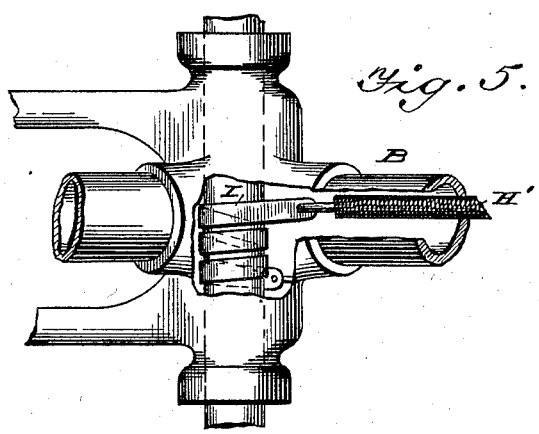
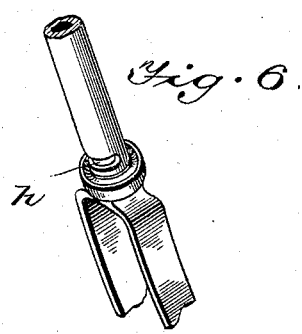
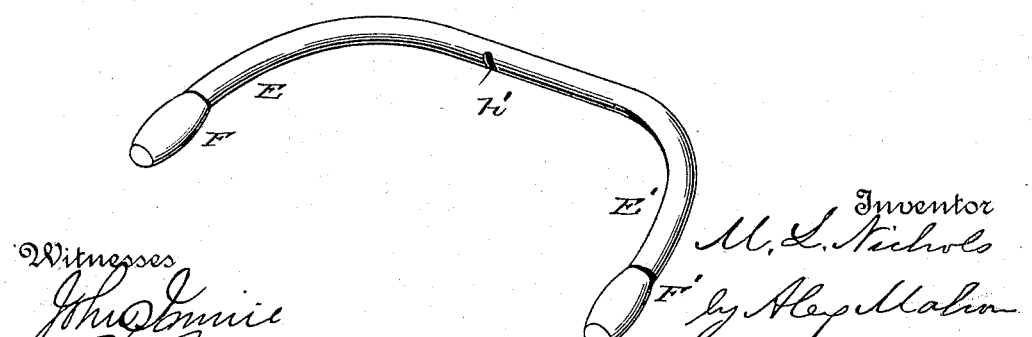

UNITED STATES PATENT OFFICE.

MARION L. NICHOLS, OF WESTFIELD, NEW JERSEY, ASSIGNOR, BY MESNE ASSIGNMENTS, TO THE POPE MANUFACTURING COMPANY, OF PORTLAND, MAINE, AND HARTFORD, CONNECTICUT.

BICYCLE-BRAKE.

SPECIFICATION forming part of Letters Patent No. 586,142, dated July 13, 1897.

Application filed March 13, 1896. Renewed April 15, 1897. Serial No. 632,340. (No model.)

*To all whom it may concern:*

Be it known that I, MARION L. NICHOLS, a citizen of the United States, residing at Westfield, in the county of Union and State of New Jersey, have invented certain new and useful Improvements in Bicycle-Brakes; and I do hereby declare the following to be a full, clear, and exact description of the invention, such as will enable others skilled in the art to which it appertains to make and use the same.

My invention relates to that class of brakes in which a flexible connection is employed between the brake and the means for actuating the same.

The invention consists in the combination, in a bicycle, of a brake to engage the axle or pedal-shaft or a hub thereon, a handle of the handle-bar carrying a screw and adapted to have an oscillating movement imparted thereto, a nut in the handle-bar with which the screw engages, a flexible connection between the brake and nut, and a spring inclosed in the handle for automatically oscillating the handle to release the brake, and to the manner of mounting the nut in a swinging frame in the handle-bar, all as hereinafter described.

In the accompanying drawings, Figure 1 is a side elevation of the front or steering wheel of the machine, showing a portion of the frame with my improvements applied to a gear-machine. Fig. 2 is a plan or top view of the same, showing the lower frame-bar in section, with a portion of the center bracket broken away, with a brake engaging a hub on the pedal-shaft. Fig. 3 is a longitudinal section through the end of the handle-bar and handle, showing the means of connecting the flexible wire, cord, or chain with the handle and one means whereby the brake may be operated by the oscillation of the handle. Fig. 4 is a plan or top view similar to Fig. 1, but showing the invention applied to a chain-machine. Fig. 5 is a plan or top view of a portion of the bearing of a chain-machine, with a portion of said bearing broken away to show one manner of applying my invention to such form of machine. Fig. 6 is a perspective view of a portion of the steering-fork, showing the slot formed therein for the passage of the flexible wire, cord, or chain to the handle and for permitting the turning or steering of the machine. Fig. 7 is a perspective view of the handle-bar, showing the slot for the passage of the wire, cord, or chain to the handle and also for permitting the adjustment of the handle-bar without disturbing the operating mechanism of the brake. Fig. 8 is a view similar to Fig. 3, showing one means for releasing the brake automatically. Fig. 9 is a perspective view of the pivoted yoke and cross-bar mounted in the handle-bar and through which the brake is operated.

In the accompanying drawings the invention is illustrated, as shown, as applied to the ordinary form of "diamond-frame" machine, in the one instance to a "gear-machine" and in the other to a "chain-machine," and wherein A represents the upper frame-bar, B the lower frame-bar, C the steering-fork, D the front wheel, E E' the handle-bar, F F' the handles, and G the pedals, all of which parts, except in the particulars hereinafter stated, being constructed in the usual or any other preferred manner.

In Figs. 1 and 2 the device is shown as applied to a gear-machine, in which case, preferably mounted on the axle or pedal-shaft, is a hub or collar H, hereinafter referred to. Connected to the frame is a brake-band I, made of any desired material and either flat or round, as shall be found most desirable. This brake-band passes around the collar H and is in turn connected with a wire, cord, or chain H', which wire, cord, or chain extends therefrom through the lower frame-bar, thence up through the steering-fork, and thence into one arm of the handle-bar, being in turn connected to the operating mechanism of the brake, which will now be described. Pivotally mounted in the end E of the handle-bar is a swinging yoke $e$, having in turn pivotally mounted therein a cross-bar $e^2$, which bar is provided centrally with a screw-thread $e^3$, hereinafter referred to. The handle F', which is mounted on the end E', has rigidly connected thereto a screw-threaded rod $e'$, which engages with the female screw formed in the arm $e$ and acts as the handle F', is oscillated on the end E' to rock the arm, and consequently to act on the wire, cord, or chain H', and cause the brake to engage or be released from engagement with the collar H. The end E' is shown as provided with a circumferential slot I', to be engaged by a screw or pin I², passing through the handle for the purpose of limiting the oscillation of the handle. This slot and pin may, however, be dispensed with and no limit placed on the oscillation. In this form of device both movements of braking and unbraking are performed by the rider, but if found desirable to release the brake automatically in Fig. 8 is shown one means by which the same may be accomplished, in which a spring L is shown connected at one end with the handle-bar and the other with the rod $e'$.

In Figs. 4 and 5 the device is shown as applied to a chain-machine, in which case the brake-band is shown as connected to the frame and then passed around the axle several times before being connected to the wire, cord, or chain H'.

To provide for the proper movement or turning of the steering-fork without interfering with the wire, cord, or chain, the opening $h$ for the passage of the same from the tubular frame to the steering-fork is made elongated and of sufficient length to provide for the full movement of said fork to permit the proper steering of the machine. To provide also for the adjustment of the handle-bar, the opening $h'$ for the passage of the wire, cord, or chain into the same is also made in elongated form, by which it will be seen that while the entire mechanism for controlling the brake and the brake are inclosed within the tubular frame the parts are as free to be manipulated as in the ordinary form of bicycle.

While the means herein shown for connecting the handle with the brake and the means for automatically releasing the brake have been found very desirable, still it will be readily seen that various modifications may be made therein without departing from the spirit or intent of my invention.

Having now described my invention, what I claim as new, and desire to secure by Letters Patent, is—

1. The combination in a bicycle, a brake to engage the axle or pedal-shaft, or a hub thereon, a handle of the handle-bar carrying a screw, and adapted to have an oscillating movement imparted thereto, a nut in the handle-bar with which the screw engages, a flexible connection between the brake and nut, and a spring inclosed in the handle for automatically oscillating the handle to release the brake, substantially as described.

2. The combination in a bicycle, a brake to engage the axle or pedal-shaft, or a hub thereon, a handle of the handle-bar carrying a screw, and adapted to have an oscillating movement imparted thereto, a nut pivoted in a swinging frame in the handle-bar to engage the screw, and a flexible connection between the nut and brake substantially as described.

In testimony whereof I affix my signature in presence of two witnesses.

MARION L. NICHOLS.

Witnesses:
ALEX. MAHON,
L. L. JOHNSON.